(12) United States Patent
Benyola (10) Patent No.: US 9,420,255 B2
(45) Date of Patent: *Aug. 16, 2016

(54) METHOD AND APPARATUS FOR GENERATING THREE-DIMENSIONAL CONTENT BASED ON USER PREFERENCES

(71) Applicant: Verizon Patent and Licensing Inc., Arlington, VA (US)

(72) Inventor: George J. Benyola, Brooksville, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,949

(22) Filed: Aug. 25, 2014

(65) Prior Publication Data

US 2014/0362183 A1    Dec. 11, 2014

Related U.S. Application Data

(63) Continuation of application No. 13/315,735, filed on Dec. 9, 2011, now Pat. No. 8,817,070.

(51) Int. Cl.
*H04N 13/00*    (2006.01)
*H04N 21/258*   (2011.01)
*H04N 21/81*    (2011.01)
*H04N 13/04*    (2006.01)
*H04N 21/45*    (2011.01)
*H04N 21/485*   (2011.01)

(52) U.S. Cl.
CPC ....... *H04N 13/0022* (2013.01); *H04N 13/0018* (2013.01); *H04N 13/0402* (2013.01); *H04N 21/25891* (2013.01); *H04N 21/4532* (2013.01); *H04N 21/4854* (2013.01); *H04N 21/816* (2013.01)

(58) Field of Classification Search
CPC .......... H04N 21/25891; H04N 21/816; H04N 21/4854; H04N 21/4532; H04N 13/0018; H04N 13/0402; H04N 13/0022
USPC ............... 348/42, 43, 46, 47, 48, 51; 345/419
See application file for complete search history.

(56) References Cited

U.S. PATENT DOCUMENTS

| | | | |
|---|---|---|---|
| 2011/0221930 A1* | 9/2011 | Katsumata | H04N 5/23248 348/226.1 |
| 2012/0223938 A1 | 9/2012 | Sines et al. | |
| 2013/0093849 A1 | 4/2013 | He et al. | |

* cited by examiner

Primary Examiner — Robert Chevalier (57) ABSTRACT

An approach is provided for enabling viewers to control the depth of three-dimensional content rendered via a set-top box. A 3D content platform receives a user input for specifying a user identifier and a mode of operation of a set-top box. A depth setting parameter is determined based on user profile information related to the user identifier. Content is then presented for display via the set-top box at the dept setting corresponding to the parameter.

20 Claims, 9 Drawing Sheets

START → DETERMINE A NUMBER OF VIEWERS WITHIN RANGE OF SET-TOP BOX (309) → ADJUST THE DEPTH SETTING PARAMETER BASED ON THE DETERMINED NUMBER OF VIEWERS (311) → END

FIG. 3A
300

START → RECEIVE A USER INPUT VIA A REMOTE CONTROL DEVICE (301) → DETERMINE USER PROFILE INFORMATION BASED ON THE USER IDENTIFIER (303) → DETERMINE A DEPTH SETTING PARAMTER BASED ON THE USER PROFILE INFORMATION AND USER INPUT SPECIFYING A MODE OF OPERATION OF THE SET-TOP BOX (305) → PRESENT CONTENT AT THE DEPTH SETTING CORRESPONDING TO THE PARAMETER ACCORDING TO A THREE-DIMENSIONAL FORMAT FOR DISPLAY VIA THE SET-TOP BOX (307) → END

METHOD AND APPARATUS FOR GENERATING THREE-DIMENSIONAL CONTENT BASED ON USER PREFERENCES

CROSS-REFERENCE TO RELATED APPLICATIONS

This application is a continuation of U.S. application Ser. No. 13/315,735, filed Dec. 9, 2011, which is herein incorporated by reference in its entirety.

BACKGROUND INFORMATION

Televisions, set-top boxes and other digital entertainment equipment have advanced to the point of enabling the rendering of three-dimensional (3D) content. For example, traditional broadcast and television media can now be provided by set-top boxes by way of various 3D presentation techniques, including stereoscopic capture, multi-view capture, 2D-plus-depth and various other approaches. Unfortunately, viewers have limited control over the parameters for affecting the rendering of 3D content at the set-top box.

Therefore, there is a need for an approach that provides flexible, efficient techniques for enabling viewers to control the rendering of three-dimensional content via a set-top box.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for enabling viewers to control the depth of three-dimensional (3D) content rendered via a set-top box are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1:
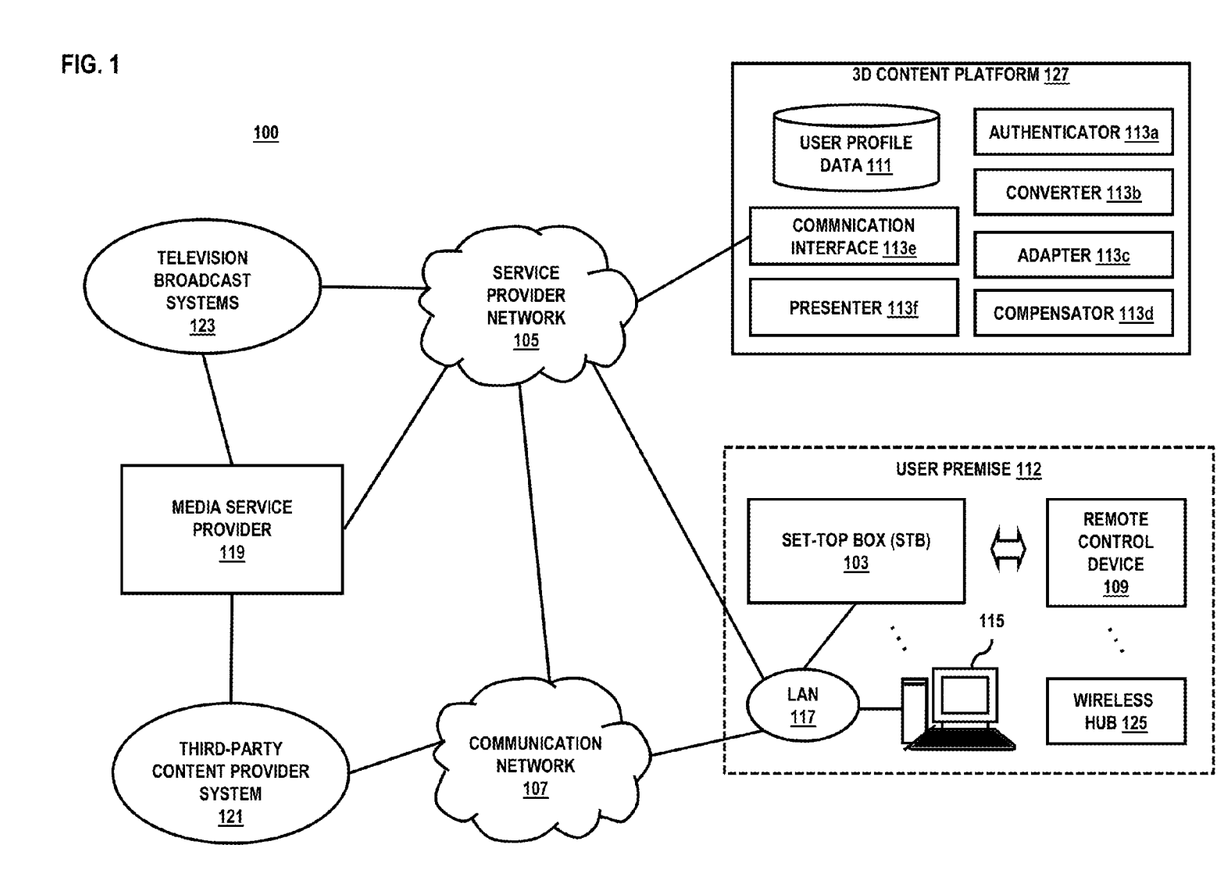
FIG. 1 is a diagram of a system capable of enabling viewers to control the depth of three-dimensional content rendered via a set-top box, according to an exemplary embodiment.

FIG. 1 is a diagram of a system capable of enabling viewers to control the depth of three-dimensional content rendered via a set-top box, according to an exemplary embodiment. For the purposes of illustration, system 100 is described with respect to interaction between a remote control device 109 configured to interface with a set-top box (STB)) 103 via, e.g., wireless communication means (e.g., infrared, etc.). In addition, the set-top box 103 is configured to interact with a three dimensional (3D) content platform 127 by way of a service provider network 105 and/or communication network 107. System 100 is configured to support full scale control and manipulation of a 3D depth parameter for affecting the output/rendering of 3D content via the set-top box on demand, such as by way of a remote control device input. In addition, the system 100 enables the automated adjusting of a 3D depth setting of the set-top box 103 in accordance with a preferred depth setting parameter associated with one or more viewers.

Typically, broadcast data, television signal data, media and other content is presented two-dimensionally—i.e., various objects represented in the content are shown to display height and width but no depth. However, the demand for three-dimensional (3D) content has grown with the advent of various 2D to 3D conversion technologies, image filtering techniques, special eyewear and 3D ready display devices. 3D content can be rendered by set-top box according to a three-dimensional encoding format (e.g., side-by-side imaging) auto-stereoscopically (without the need for special equipment such as eyewear) or stereoscopically (with the eyewear). In certain embodiments, "three-dimensional" (3D) content pertains to any information capable of being rendered to be perceived by a viewer as having the illusion of depth.

The richness of the 3D experience is greatly impacted by the depth setting, which controls the appearance of depth within the three-dimensional field. The lower the depth setting, the more closely the content is aligned with 2D perception. Conversely, a higher depth setting corresponds to the appearance of greater depth of the content. Unfortunately, viewers have limited control over the depth setting and hence the degree to which 3D content is rendered via the set-top box for display. Instead, the viewer must simply accept a default setting established by the content or media services provider. Moreover, viewers are unable to adjust the depth of 3D content on demand or in response to the presence of multiple viewers based on user specific preferences. As a result, the overall viewer experience is compromised.

To address this issue, system 100 includes remote control device 109 that is configured to enable a user to specify a depth setting parameter for controlling the appearance of depth within content rendered by the set-top box 103. The depth setting parameter, as input by a viewer at the remote control device, is conveyed to a 3D content platform 127. The 3D content platform 127 enables set-top box users to control and regulate the extent to which objects rendered as content are perceived by viewers three dimensionally. It is noted that the appearance of increased or decreased 3D depth by the 3D content platform 127, per user provided input, may be based on various aesthetic qualities and characteristics as applied to the content. This may include, for example, image shading, light variance, offset, rotation, contouring, beveling, shadow effects and other perceptual elements.

The 3D content platform 127 is maintained in connection with a service provider network 105 or communication network 107. By way of example, the 3D content platform 127 may include one or more interfaces for enabling real-time processing of content as provided by a television broadcast system 123, media service provider 119 or third-party content provider system 121. As such, the 3D content platform 127 is configured to perform various executions for supporting a 3D mode of operation of the set-top box 103, including: (1) generating content conforming to a 3D format; (2) converting 2D content to content conforming to a 3D; (3) automatically adapting a depth setting for affecting the display of 3D content based on a preferred depth setting parameter of a viewer; (4) automatically adapting a depth setting for affecting the display of 3D content based on a preferred depth setting parameter of multiple viewers; (5) adapting a depth setting for affecting the display of 3D content on demand based on user supplied input (e.g., via a remote control device). It is noted, therefore, that the 3D content platform 127 may perform various direct or intermediary functions on behalf of, or in conjunction with, various content providers for enhancing the 3D experience of set-top box users. In addition, the 3D content platform 127 may generate content in 3D format compatible with various 3D ready displays, entertainment consoles, etc.

By way of example, the 3D content platform 127 includes one or more modules for performing the above described executions. It is contemplated that the functions of these modules may be combined in one or more modules or performed by other modules of equivalent functionality. In this embodiment, the 3D content platform 127 includes an authenticator 113a, a converter 113b, an adapter 113c, a compensator 113d, a communication interface 113e and a presenter 113f. The 3D content platform 127 also maintains user profile data 111 for indicating profile information related to one or more subscribers.

The converter 113b is configured to generate (or convert) 3D content according to a variable three-dimensional depth setting. The depth setting corresponds to a depth setting parameter—i.e., a value representing an extent of depth and/or offset projection of content (or a specific object thereof) within a three-dimensional field. As such, the converter 113b generates content in a 3D format for execution by a set-top box 103 to include a dimension of depth as well as width and height. 3D formats employed by the converter 113b may include, for example, side-by-side imaging, top-and-bottom imaging, frame packing, etc. In addition, the converter 113b may perform various real-time depth generation and adaptation techniques for enabling conversion of 2D content, including optical flow and structure analysis, geometric vanquishing point analysis, focus analysis and scene change estimation, occlusion and motion detection, depth mapping, anaglyph content processing, etc. Any known and still developing protocols, commercial technologies and tools for generating 3D content, converting 2D to 3D, enabling stereoscopic or auto-stereoscopic present of content, or the like may be employed by the 3D content platform 127.

By way of example, a greater depth setting corresponds to a greater dimension of depth of an object rendered as content versus the 2D plane. Conversely, a lesser depth setting corresponds to a lesser dimension of depth, with the lowest possible depth setting being equivalent to a 2D perspective of the object. In one embodiment, the converter 113b may be further adapted to employ various resolution, tinting, shading, opacity, coloring, rotating and lighting techniques for generating 3D according to a specified depth setting parameter. The depth setting parameter may be provided as input via the remote control device 109 as a value representing a depth factor, a depth percentage, a degree of offset from the 2D plane, a ratio, etc.

The authenticator 113a determines whether a user identifier value, as specified via a communication signal from a set-top box 103, corresponds to a profile of a user subscribed to the 3D content platform 127. Upon receiving the communication signal, the authenticator 113a cross-references the user identifier against the user profile database 111 to determine any existing records pertaining to the viewer. The user profile information may include, for example, data for referencing the user relative to a remote control device 109 of that user, including a radio-frequency identifier (RFID), an identification code, a subscriber identity module (SIM) or other machine-readable or detectable information. Also, the user profile may include data specifying the name, address, and other contact details of the user, as well as data representative of a level of association the user has with the premise 112 or respective set-top boxes 103.

The user profile information 111 may also specify various set-top box 103 and/or device configuration settings. By way of example, STB 103 configuration data can relate to monitor size, audio/video interface (e.g., High-Definition Multimedia Interface (HDMI)) setup, audio settings, time zone, network address settings, etc), programming guides (e.g., available channels, blocked and hidden channels settings, skin preferences, customizations, etc.) and personal recording settings (e.g., show names, times record types (e.g., all, single, series, latest), record channels, etc.)). In addition, a preferred depth setting parameter to be applied when rendering 3D content at a set-top box 103 may be specified as profile information 111. It is noted that the user profile information may also indicate the depth setting parameters of various other viewers associated with one or more STBs 103 within a given user premise 112.

Communication signals are transmitted to the 3D content platform 127 by way of a wireless HUB 125 or other network connectivity means available at the user premise 112; the signal indicating a request by one or more viewers (at the user premise 113) to enable a 3D mode of operation of the set-top box 103. A communication interface 113e may be adapted to receive, decode and interpret the communication signals conforming to various communication protocols. In addition, response signals may be transmitted to the set-top box 103 via the interface 113e accordingly. The authenticator 113a determines a response action to be carried out by the platform 127 based on the request, as shown below with respect to Table 1:

TABLE 1

| Cause rendering of three-dimensional content at the set-top box according to: |
| --- |
| A default depth setting-this depth setting is executed when no preferred depth setting is specified or when multiple viewers |

TABLE 1-continued

Cause rendering of three-dimensional content
at the set-top box according to:

are using the set-top box.
A preferred depth setting-this depth setting is executed
automatically based on a depth setting parameter specified
in a user profile when no on demand depth setting is specified.
An increased/decreased depth setting-this depth setting is
executed on demand in response to a depth setting parameter as
input via a remote control device or other input device coupled
to the set-top box.
A compensatory (average) depth setting-this depth setting
corresponds to the average of the preferred depth setting
parameters of multiple viewers for execution when multiple
viewers are using the set-top box.

The communication signal for indicating the request may also specify the depth parameter. The depth parameter may be expressed as a value representing a depth offset ratio, depth percentage, depth scale or factor to be applied by the converter 113b in generating 3D content corresponding to the desired depth setting. Hence, the converter 113b is caused to execute its various algorithms and processing techniques using the parameter as a variable. By way of example, a depth setting parameter of 10 on a scale of 1 to 10 may be encoded in the communication signal for indicating the highest possible depth setting is to be used for generating 3D content. Under this scenario, a spatial, motion or density algorithm may be applied to each pixel based (in part) on this parameter to generate corresponding vectors relative to the desired depth. Of note, the above described response actions of Table 1 are initiated for execution by the authenticator 113a based, at least in part, on determined user identifier information and a corresponding depth setting parameter (e.g., based on the profile or as specified via user input).

The authenticator 113a interacts with the adapter 113c or compensator 113d to affect the processing of content by the converter 113b. In certain embodiments, the adapter 113c is configured to determine a current depth setting of the set-top box, i.e., as set manually by the viewer during previous operation of the set-top box 103, as set by default, etc. In addition, the adapter 113c determines an amount of increase or decrease of the depth setting to be applied below or above the current depth setting. As will be discussed more fully later on, the viewer may be presented with a visual indicator for representing an amount of increase or decrease. This action corresponds to the selection of one or more controls at a panel of the set-top box 103, one or more buttons of a remote control device 109, etc.

In one embodiment, the compensator 113d is configured to compute a compensatory or average depth setting parameter to be applied by the converter 113b. The compensator 113d generates a compensatory depth setting parameter in response to the determining of multiple viewers of the set-top box. Each viewer may have a different preferred depth setting parameter as associated with their unique user identifier. Under this scenario, a first viewer and second viewer whose preferred depth setting parameters are 3 and 10 respectively (on a 1-10 scale) results in a computed compensatory depth setting parameter of 6.5 (e.g., the sum of the respective parameters divided by the total number of viewers). It is noted that various means of determining the number of viewers may be employed, including through the use of presence sensors at the set-top box 103, direct indication of multiple different user identifiers via a remote control device 109 input, detection of multiple control signals from different remote control devices of respective viewers, etc.

Although the adapter 113c and compensator 113d are explained in the context of altering the depth setting parameter, it is contemplated that other parameters affecting the rendering of 3D content may be utilized in addition to (or in the alternative to) depth setting parameter.

In one embodiment, the presenter 113f enables the presentment of various interfaces and controls for enabling viewer interaction with the 3D content platform 127 via the STB 103. The presenter 113f may be implemented, for example, as a web based application or web service available for display via the STB 103 or as a widget capable of operation via the STB 103. In the case of the latter, the presenter 113f may present content in the form of various controls and selection options to the user via one or more widgets. By way of example, the presenter 113f may operate in connection with the authenticator 113a to provide a subscription interface for allowing viewers to subscribe to the 3D content platform 127. This may include presenting of various data entry fields for receiving information required for establishing a user profile, entry of a preferred depth setting, etc. As another example, the presenter 113f may provide a viewer selection interface for enabling one or more viewers to establish their respective preferred depth setting parameters, indicate the presence of one or more viewers, approximate a number of guest viewers present in the room, etc.

It is noted that the response actions of Table 1 as well as the above described executions of the authenticator 113a, converter 113b, adapter 113c and compensator 113d correspond to a 3D mode of operation of the set-top box 103. Furthermore, it is noted that the 3D content platform 127 may act as a content filtering mechanism for the set-top box 103, performing the above described executions in real-time regardless of the 3D capabilities of the set-top box, computer 115 or complimentary display devices.

Operation of the remote control device 109 for generating control signals to affect 3D operation of the STB 103 is facilitated through various input means. This includes, for example, a touchable display, keypad, keyboard, one or more selection buttons or other user input means. The remote control device 109 is further configured to a wireless hub 125 of which the set-top box 103 is mutually configured. By way of example, the wireless hub 125 is implemented as hardware and/or software for generating a wireless communication link/local area network (LAN) 117 through which respective devices in a user premise 112 may communicate relative to a subscription with a service provider 105 or communication network 107. It is noted also that a computing device 115 may also be configured mutually to the LAN 117 and set-top box 103 for enabling integration of computing controls via the STB 103.

In certain embodiments, control signals generated at the remote control device 109 in response to user input pertaining to 3D operation is transmitted to the STB 103 via the LAN 117 (e.g., as generated by the wireless hub 125). Alternatively, the control signals may be generated as wireless data that is packaged based on proximity and short range communication protocols, including Bluetooth or infrared. In the latter approach, the remote control device 109 readily interacts with the set-top box 103 with or without the wireless hub 125. In either implementation, the set-top box 103 may feature configuration settings for permitting it to be controlled by the remote control device 109. This may be carried out through a permission process, wherein the user enables activation of a relationship between the devices as they detect one another, through a LAN configuration process, a signal exchange process between the remote control device 109 and the set-top box 103 (e.g., for programming the remote control device relative to the STB 10e), etc. It is noted in the various embodiments that any means of wireless communication between the set-top box 103 and remote control device 109 are applicable. As a result, any developing or well known protocols for facilitating wireless communication relative to the various devices 103, 115 and 109 configured to the LAN 117 may be implemented.

By way of example, set-top box 103 and/or computing device 115 may be configured to communicate using one or more of networks 105 and 107. System 107 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect set-top boxes 103 to various sources of media content, such as one or more third-party content provider systems 121. Although depicted in FIG. 1 as separate networks, communication network 107 may be completely or partially contained within service provider network 105. For example, service provider network 105 may include facilities to provide for transport of packet-based communications.

According to certain embodiments, set-top boxes 103 and/or computing devices 115 may be configured to communicate over one or more local area networks (LANs) corresponding to a user premise 112. In this manner, routers (e.g., wireless hub 125) may be used for establishing and operating, or at least connecting to, a network such as a "home" network or LAN 117, and is used to route communications within user premises 113a-113n. For example, set-top box 103 may be a set-top box communicatively coupled to LAN 117 via a router and a coaxial cable, whereas computing devices 115 may be connected to LAN 117 via a router and a wireless connection, a network cable (e.g., Ethernet cable), and/or the like. It is noted, however, that in certain embodiments set-top box 103 may be configured to establish connectivity with LAN 117 via one or more wireless connections. Further, set-top box 103 and computing device 115 may be uniquely identified by LAN 117 via any suitable addressing scheme. For example, LAN 117 may utilize the dynamic host configuration protocol (DHCP) to dynamically assign "private" DHCP internet protocol (IP) addresses to set-top box 103 and computing devices 115, i.e., IP addresses that are accessible to devices such as devices 103 and 115 that are part of LAN 117 facilitated via router, i.e., connected to a router.

Accordingly, it is noted that user premises 113 may be geospatially associated with one or more regions, one or more user profiles and one or more user accounts. This information may include content or user profile information among many other things. Additionally, set-top boxes 103 associated with the user premises 113 may be configured to communicate with and receive signals and/or data streams from media service provider (MSP) 119 or other transmission facility, i.e., third-party content provider system 121. These signals may include media content retrieved over a data network (e.g., service provider network 105 and/or communication network 107), as well as conventional video broadcast content. In various embodiments, media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, MSP 119 may provide (in addition to their own media content) content obtained from sources, such as one or more third-party content provider systems 121, one or more television broadcast systems 123, etc., as well as content available via one or more communication networks 107, etc.

Figure 2:
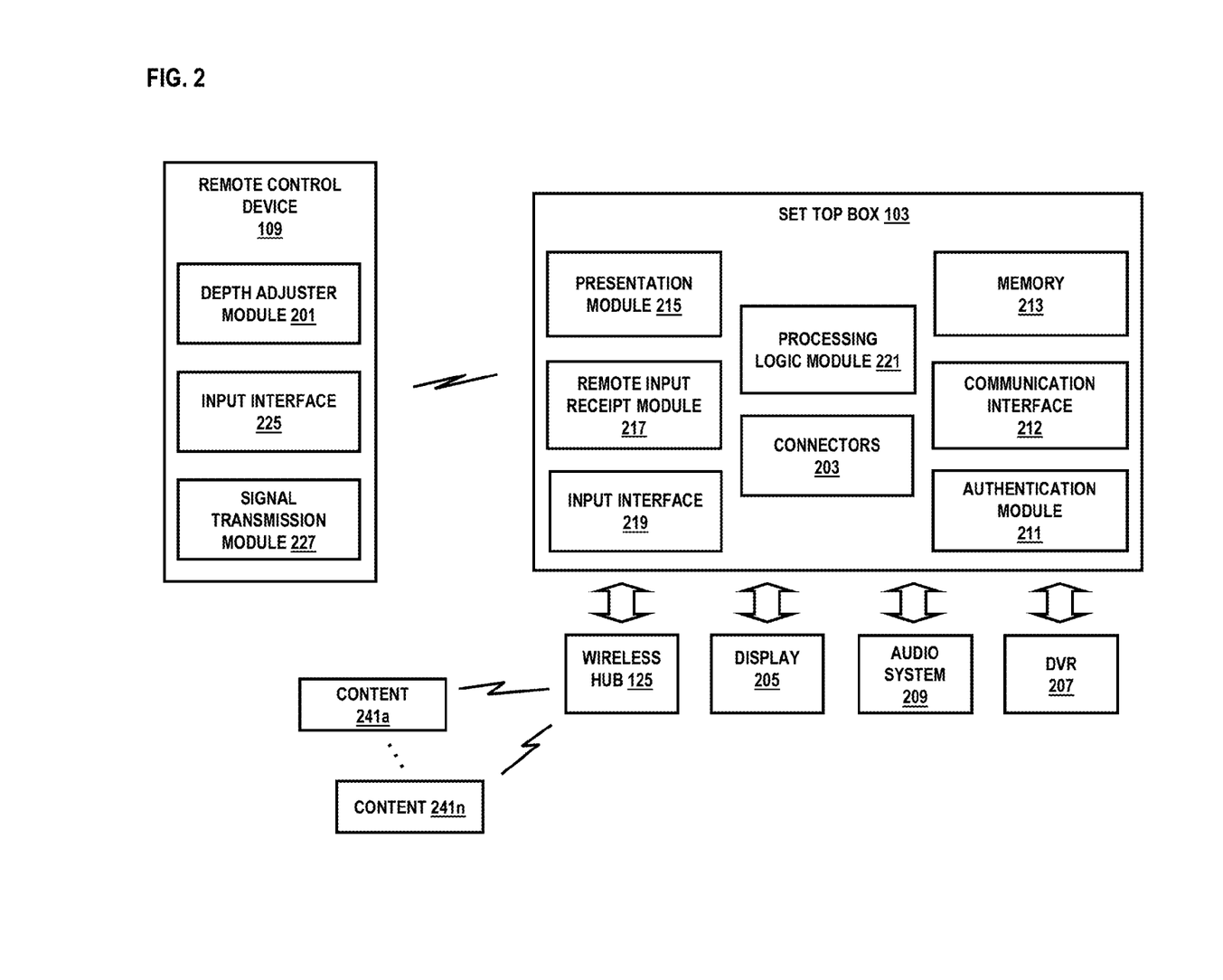
FIG. 2 is a diagram of the various components of a remote control device and set-top box for enabling a three-dimensional mode of operation of the set-top box, according to an exemplary embodiment.

FIG. 2 is a diagram of the various components of a remote control device and set-top box for enabling a three-dimensional mode of operation of the set-top box, according to an exemplary embodiment. STB 103 comprises a control architecture featuring a collection of modules that interact to enable specific functions. In addition, the STB 103 may include various other operating system and dynamic controls (not shown) conforming to its manufacture, display characteristics, etc. By way of example, set-top box 103 may comprise any suitable technology to receive one or more content streams from a media source, such as MSP 119 and one or more third-party content provider systems 121. The content streams include content 241a-241n retrieved over one or more data networks (e.g., networks 105 and/or 107), as configured via a wireless hub 125 (e.g., router), in response to commands from one or more media applications. The content 241a-241n may or may not be generated according to a 3D format.

According to various embodiments, set-top box 103 (e.g., STB) may also include inputs/outputs (e.g., connectors 203) to display 205 and DVR 207, the wireless hub 125 and audio system 209. By way of example, audio system 209 may comprise a conventional audio-video receiver capable of monaural or stereo sound, as well as multi-channel surround sound. Audio system 209 may include speakers, ear buds, headphones, or any other suitable component configured for personal or public dissemination. As such, set-top box 103, display 205, DVR 207, and audio system 209, for example, may support high resolution audio and/or video streams, such as high definition television (HDTV) or digital theater system high definition (DTS-HD) audio. Thus, set-top box 103 may be configured to encapsulate data into a proper format with required credentials before transmitting onto one or more of the networks of FIG. 1 and de-encapsulate incoming traffic to dispatch data to display 205 and/or audio system 209. This may include de-encapsulation of 3D content as generated by the 3D content platform 127.

In various embodiments, the set-top box 103 may also permit the embedding or overlay of additional content (e.g., messages, captions, advertisements) 241a-241b for presentment along with any broadcasted or televised content rendered to the display 205. Various built in menus, information frames and content windows, referred to as widgets, may be provided by the media service provider 119 or the like for presentment along with media content, as rendered by a presentation module 215. Certain widgets may also feature interactive buttons that may be controlled by the user. An example of such a widget is a depth adjustment indicator that indicates a level of a depth setting parameter. The depth adjustment indicator is interactive, and thus may be shown to fluctuate in response to an increase or decrease in the depth setting parameter by way of a remote control device 109. As another example, a viewer selection interface may be executed as a widget for enabling one or more viewers to establish their respective preferred depth setting parameters, indicate the presence of one or more viewers, approximate a number of guest viewers present in the room, etc. These capabilities are further detailed with respect to FIGS. 4A and 4B.

In certain embodiments, display 205 and/or audio system 209 may be configured with internet protocol (IP) capability (i.e., includes an IP stack, or is otherwise network addressable), such that the functions of set-top box 103 may be assumed by display 205 and/or audio system 209. In this manner, an IP ready, HDTV display or DTS-HD audio system may be directly connected to one or more service provider networks 105 and/or communication networks 107. Although set-top box 103, display 205, DVR 207 and audio system 209 are shown separately, it is contemplated that these components may be integrated into a single component or other combination of components.

In one embodiment, an authentication module 211 may be provided by set-top box 103 to initiate or respond to authentication schemes of, for instance, service provider network 105, third-party content provider systems 121, or various other content providers, e.g., television broadcast systems 123, etc. Authentication module 211 may provide sufficient authentication information, e.g., a user name and password, a key access number, a unique machine identifier (e.g., MAC address), and the like, as well as combinations thereof, to a corresponding communications (or network) interface 212 for establishing connectivity, via LAN 117, and to platform 127. Authentication at set-top box 103 may identify and authenticate a second device (e.g., computing device 115) communicatively coupled to, or associated with, set-top box 103, or vice versa. Further, authentication information may be stored locally at memory 213, in a repository (not shown) connected to set-top box 103 or at a remote repository (e.g., device or user profile repository 111).

Authentication module 211 may also facilitate the reception of data from single or disparate sources. For instance, set-top box 103 may receive broadcast video from a first source (e.g., MSP 119), signals from a media application at second source (e.g., computing device 115), and a media content stream from a third source accessible over communication networks 107 (e.g., third-party content provider system 121). As such, display 205 may present the broadcast video, media application, and media content stream to the user, wherein set-top box 103 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 211 can authenticate a user to allow them to interact with one or more third-party subscriber account features associated with third-party content provider systems 121.

It is noted that the authentication module 211 of the set-top box 103 may interface with the authenticator of the 3D content platform 127. As such, user profile information, device settings and other pertinent user and/or device related configuration data may be shared as needed. An authentication process as performed at the STB 103 may be associated with an authentication process of the 3D content platform 127 for establishing a communication between the two via a communication network. This includes, for example, enabling the exchanging of communication signals via a wireless HUB 125 for indicating a request regarding a 3D mode of operation of the set-top box 103.

In one embodiment, presentation module 215 may be configured to receive media content streams 241a-241n (e.g., audio/video feed(s) including media content retrieved over a data network) and output a result via one or more connectors 203 to display 205 and/or audio system 209. In this manner, presentation module 215 may also provide a user interface for a media application via display 205. Aural aspects of media applications may be presented via audio system 209 and/or display 205. In certain embodiments, media applications may be overlaid on the video content output of display 205 via presentation module 215. The media content streams 241a-241n may include content received in response to user input specifying media content 241a-241n that is accessible by way of one or more third party content provider systems 121 and, thereby, available over at least one data network (e.g., network 105 and/or 107). In addition, 2D content as converted into 3D content of a given 3D format may also be processed by the presentation module 215.

Media content 241a-241n may be retrieved and streamed by set-top box 103 for presentation via display 205 and/or audio system 209. Accordingly, presentation module 215 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

In one embodiment, a remote input receipt module 217 receives control signals generated by a remote control device 109. By way of example, the control signal may be received by the remote input receipt module 217 and subsequently decoded and associated with its equivalent STB 103 or media interaction function by a processing logic module 221. As another example, the control signal may be received as STB 103 or media interaction control function data directly.

Connector(s) 203 may provide various physical interfaces to display 205, audio system 209, as well as other peripherals; the physical interfaces may include, for example, RJ45, RJ11, high definition multimedia interface (HDMI), optical, coax, FireWire, wireless, and universal serial bus (USB), or any other suitable connector. Regardless of the connection medium, the STB 103 may be induced by the remote control device 109 to enable user control over the various features of the STB or media content 241a-241b displayed thereon.

In one embodiment, the remote control device 109 features a depth adjuster module 201 for enabling a viewer to modify a depth setting parameter for affecting the presentment of 3D content via the STB 103. The depth adjuster module 201 may correspond to one or more controls or buttons at the remote control device, including for example, increase and decrease buttons. In certain embodiments, the depth adjuster module 201 may also correspond to a 3D mode of operation activation button, a user identifier button, and various other selectable controls for receiving user input. Also, the remote control device 109 features a signal transmission module 227, which generates and transmits control signals from the remote control device 109 for enabling a 3D mode of operation of the STB 103 responsive to the user input. By way of example, the signal transmission module 227 transmits data received as input at the remote input receipt module 217 of the STB 103, such as via a wireless communication session. As another example, the signal transmission module 227 generates a control signal conforming to a specific STB 103 or media interaction control function. It then transmits the control signal to the remote input receipt module 217 accordingly in this form.

It is noted that the remote control device 109 may be implemented as a basic transmitter device capable of relaying user input to the STB 103. Alternatively, the device 109 may be implemented as a wireless computing device such as a laptop or tablet PC, a mobile communication device such as a cell phone or smartphone, or any other wireless enabled device. Under this scenario, the remote control device may feature a touchable display featuring various touch sensitive buttons as opposed to physical buttons. Generally, the remote control device 109 allows users to readily manipulate and dynamically modify parameters affecting the media content being viewed at the STB display 205. In other examples, the remote control device 109 may also include (not shown) a cursor controller, trackball, touch screen, touch pad, keyboard, and/or a key pad for enabling alternative means of controlling the STB and interacting with content 241*a*-241*n*.

Figures 3A, 3B:
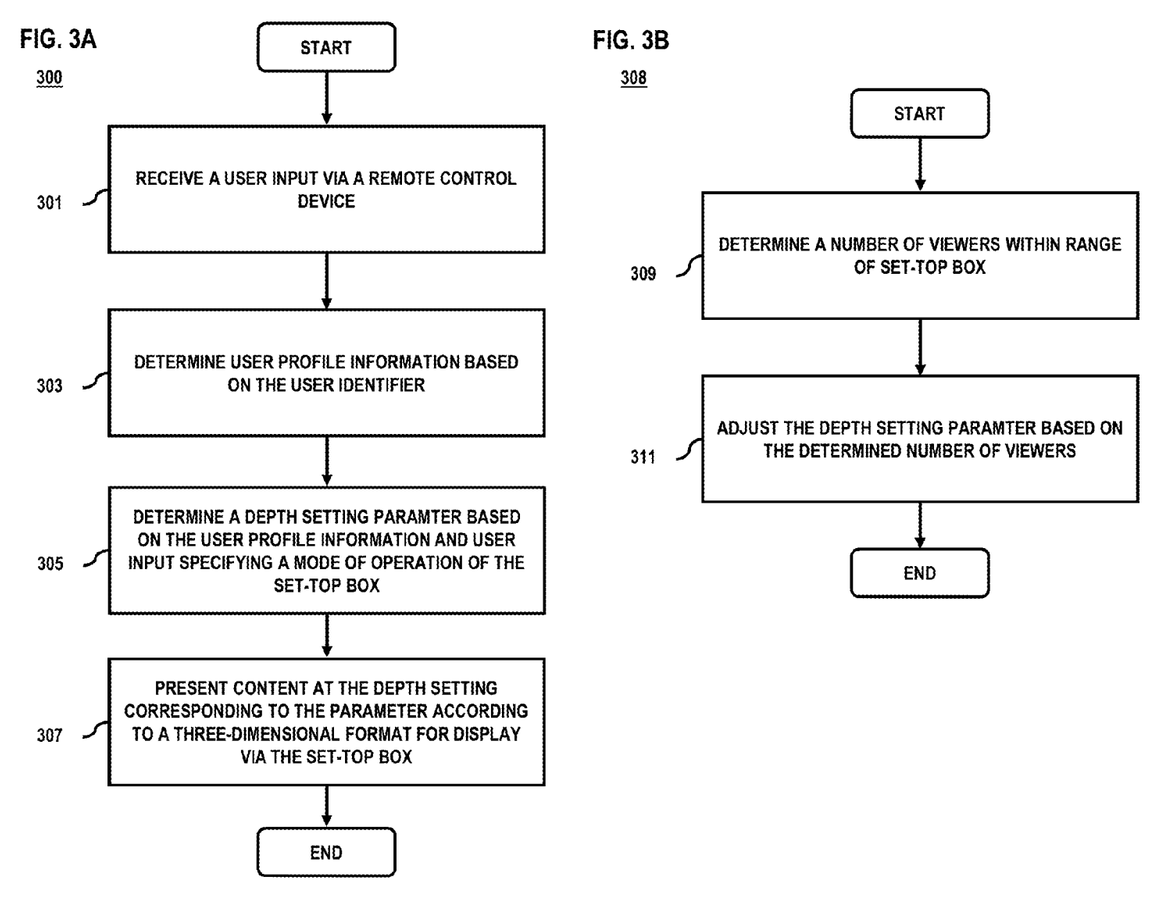
FIGS. 3A and 3B are flowcharts of processes for enabling viewers to control the depth of three-dimensional content rendered via a set-top box, according to various exemplary embodiments.

FIGS. 3A and 3B are flowcharts of processes for enabling viewers to control the depth of three-dimensional content rendered via a set-top box, according to various exemplary embodiments. For the purpose of illustration, the processes are described with respect to FIG. 1. It is noted that the steps of processes 300 may be performed in any suitable order, as well as combined or separated in any suitable manner. In step 301, the 3D content platform 127 receives a user input via a remote control device 109. As noted previously, the user input may be received by the platform 127 as a communication signal corresponding to a request for 3D operation of the set-top box. This may include, for example, a request to increase or decrease a depth setting for rendering 3D content or activating a 3D mode of operation via the set-top box 103. The input may also specify a particular viewer or enable the establishing of various settings (e.g., preferred depth setting, default depth setting) relative to a given viewer. Still further, a user identifier corresponding to the viewer or user of the remote control device may be specified as user input.

It is noted that the user input, as received by way of input/data entry at the remote control device, may be relayed to the set-top box and subsequently translated into a communication signal by the set-top box for conveyance at the 3D content platform 127. Alternatively, the remote control device may be configured to directly communicate with the set-top box and 3D content platform 127. In either scenario, the wireless hub 125 is configured to enable transmission of the user input via a communication network accordingly.

In another step 303, user profile information 111 is determined based on the user identifier associated with the user input. As noted, the user profile information may include account details, user related details and various user preferred device and/or set-top box configuration settings. In addition, the user profile information may specify a preferred depth setting parameter of the user, wherein the depth setting corresponds to a value to be applied for rendering 3D content via the set-top box according to a specific depth setting. Per step 305, a depth setting parameter is determined based on the user profile information and user input specifying a mode of operation of the set-top box. For example, when the viewer requests a 3D mode of operation of the set-top box 103, the content is caused to be generated by the 3D content platform 127 to feature a depth setting corresponding to the depth setting parameter.

In step 307, content is presented at the depth setting corresponding to the parameter according to a three-dimensional format for display via the set-top box. As noted, in certain embodiments that the depth setting parameter may be represented as a factor, percentage, or other the like. Consequently, the depth setting parameter may be proportional to, but not necessarily equivalent to the depth setting. Thus, a depth setting parameter of 50% as specified in a user profile may correspond to an actual depth setting of 25% due to the various characteristics of the set-top box, display, content being provided, etc.

In step 309 of process 308 (FIG. 3B), the 3D content platform 127 determines a number of viewers associated with the set-top box 103. In another step 311, the platform 127 adjusts the depth setting parameter based on the determined number of viewers. As noted previously, the adjustment corresponds to a compensatory depth setting parameter, representing the average of the preferred depth setting parameter of multiple viewers. Alternatively, a default depth setting parameter may also be applied, such as when no particular preferred depth setting is indicated in a given user profile.

A value for representing the number of viewers is conveyed to the platform 127 based on input provided by the user via the remote control device 109. The input may include a selection of one or more viewers present for viewing content via the set-top box 103. Another input may include an approximation of the number of guests (optional). In the case of viewer selection, the preferred depth setting parameters of each viewer is applied while guests may be associated with a default depth setting parameter.

Alternatively, the number of viewers may be determined by way of one or more sensors at the set-top box and/or a display as coupled thereto. For example, one or more proximity sensors may be integrated for use by the set-top box for approximating a number of viewers within the user premise 112. As another example, a user identifier value may be determined for one or more viewers based on location based service (LBS) techniques. Under this scenario, the mobile devices of various viewers within a predetermined proximity of the set-top box 103 or the wireless hub 125 (e.g., a router) may be detected. As such, the number of viewers may be extrapolated from the number of detected mobile devices at the premise, whether the viewers are subscribed or unsubscribed with the 3D content platform 127. Subscribed users may be linked to a specific preferred depth setting parameter while unsubscribed users are optionally assigned a default depth setting parameter.

Figure 4A:
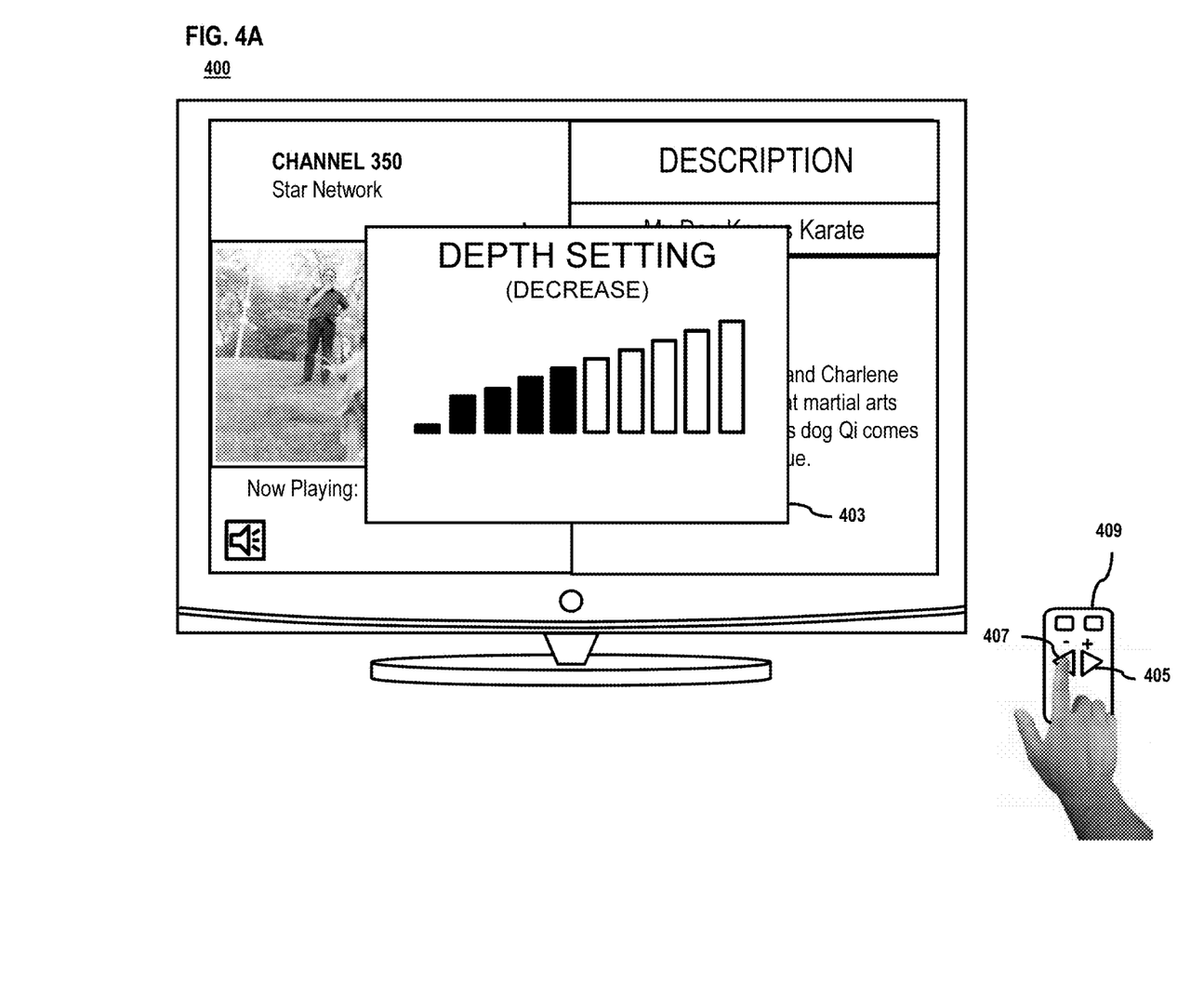
FIG. 4A is a diagram of an interface for manipulating a depth setting parameter for affecting a three-dimensional mode of operation of a set-top box by way of a remote control device, according to an exemplary embodiment.

FIG. 4A is a diagram of an interface for manipulating a depth setting parameter for affecting a three-dimensional mode of operation of a set-top box by way of a remote control device, according to an exemplary embodiment. By way of example, a depth setting indicator 403 is caused to be presented to a display 400 based on user selection of one or more buttons of the remote control device 409, including increase and decrease buttons 405 and 407. In certain embodiments, the 3D content platform operates in connection with the set-top box to present the depth setting indicator 403 as a widget or other interactive interface.

When a user selects the decrease button 407, as shown, a control signal is transmitted to the set-top box for increasing a depth setting parameter. Also, a communication signal is transmitted to the 3D content platform for requesting generation of 3D content corresponding to the selected depth setting parameter. It is noted that the depth setting indicator 403 also decreases as the decrease button 407 is pressed—i.e., the number of shaded bars for representing a depth setting parameter is lowered. Conversely, selection of the increase button 405 causes the number of shaded bars to increase accordingly.

The increase and decrease buttons 405 and 407 respectively enables users (viewers) to adjust the depth setting of the set-top box on demand.

Figure 4B:
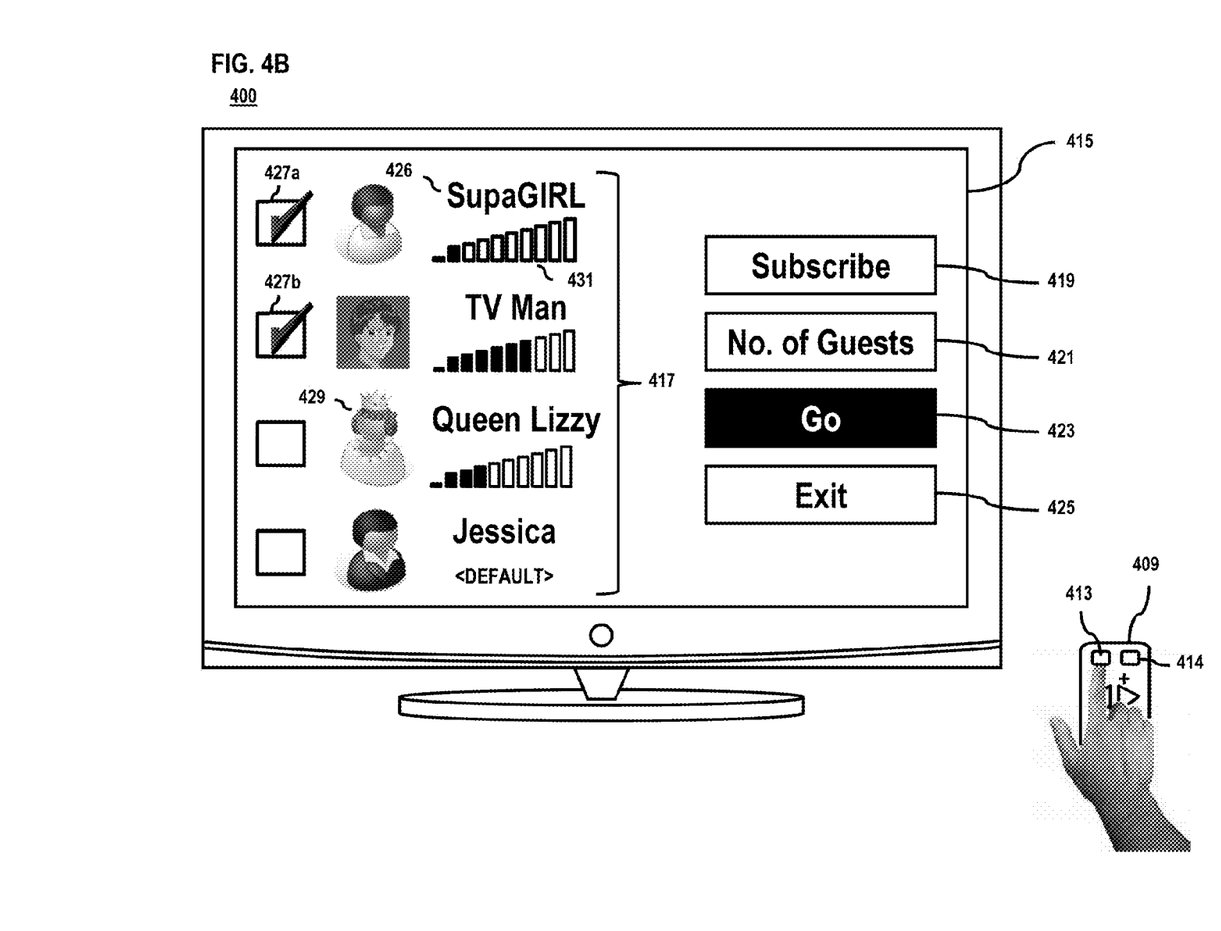
FIG. 4B is a diagram of an interface for selecting multiple viewers to view content according to a three-dimensional mode of operation of a set-top box by way of a remote control device, according to an exemplary embodiment.

FIG. 4B is a diagram of an interface for selecting multiple viewers to view content according to a three-dimensional mode of operation of a set-top box by way of a remote control device, according to an exemplary embodiment. By way of example, the display 400 is caused to present the viewer selection interface 415 in response to the selection of a viewer control button 413 of the remote control device 409. The interface enables a user to select one or more viewers of the set-top box, and particularly, those viewers registered with the 3D content platform for enabling a 3D mode of operation.

Under this scenario, the nicknames (e.g., 426), avatars (e.g., 429) and depth setting indicators (e.g., 431) of the viewers associated with the set-top box are displayed as a list 417. The depth setting indicators correspond to the preferred depth setting parameters of each viewer. Nickname information also corresponds to that specified in the user profile information. Each of the viewers is cross referenced in the user profile database of the platform by way of unique user identifier information. By way of example, the viewer nicknamed TV Man has the highest depth setting parameter followed by Queen Lizzy and SupaGirl. Another viewer named Jessica is also shown as having a default depth setting parameter. By way of example, Jessica is assigned a default depth setting parameter given that she did not provide a preferred depth setting parameter (e.g., this information was left blank in her user profile).

A viewer having access to the remote control device 409 can activate one or more checkboxes 427a and 427b for indicating which of the users are presently viewing content via the STB. Hence, activation of checkboxes 427a and 427b in this example indicates that SupaGirl and TV Man are presently engaging the set-top box to view content. An Enter button 414 of the remote control device may be pressed by the viewer to select or deselect a particular checkbox. Upon selecting a Go action button 423, the 3D content platform is made aware of the number of viewers engaging the set-top box as well as which user identifier information to be referenced for determining a compensatory depth setting parameter. As noted previously, the 3D content platform computes a compensatory depth setting parameter to reflect the average depth setting parameter required to accommodate multiple viewers. Under this scenario, with SupaGirl and TV Man's preferred depth setting parameters of 1 and 6 respectively, the compensatory depth setting parameter is 3.5.

Additional action buttons may also be selected by the viewer via the interface 415. For example, an Exit action button 425 may be selected via the remote control device 409 to exit the interface and return to previously streamed content. Also, a Subscribe action button 419 may be selected to enable the registration of additional viewers with the platform or to edit current user profile information. Selection of this button may result in the invoking of another interface featuring various data entry fields for generating or editing user profile information.

Still further, a No. of Guests action button 421 may be selected for enabling the viewer to approximate/indicate a number of unsubscribed viewers currently engaging the set-top box. This optional feature may be used to enable the 3D content platform to compute an optimal 3D depth setting to be applied for small, medium or large sized gatherings. In certain embodiments, it is contemplated that the preferred depth setting parameters of selected viewers SupaGirl and TV Man are also accounted for in the computation accordingly. Spatial characteristics data, including dimensions of the user premise or relative placement of the set-top box or display 400 with respect to the viewers or guests may also be factored into the computation. The optimal setting may be computed, for example, by the compensator 113d of the 3D content platform 127 of FIG. 1.

Figure 5A:
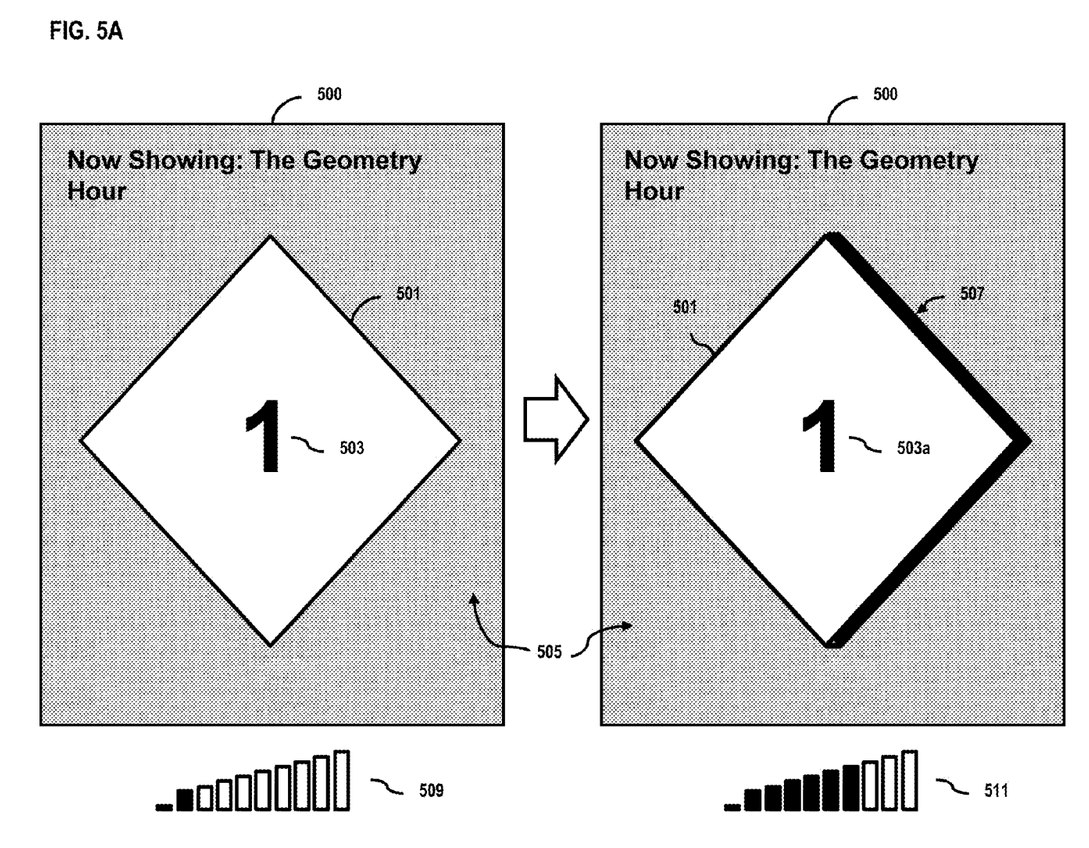
FIGS. 5A and 5B are diagrams of content as presented to a display of a set-top box based on various depth setting parameters of viewers, according to an exemplary embodiment.
Figure 5B:
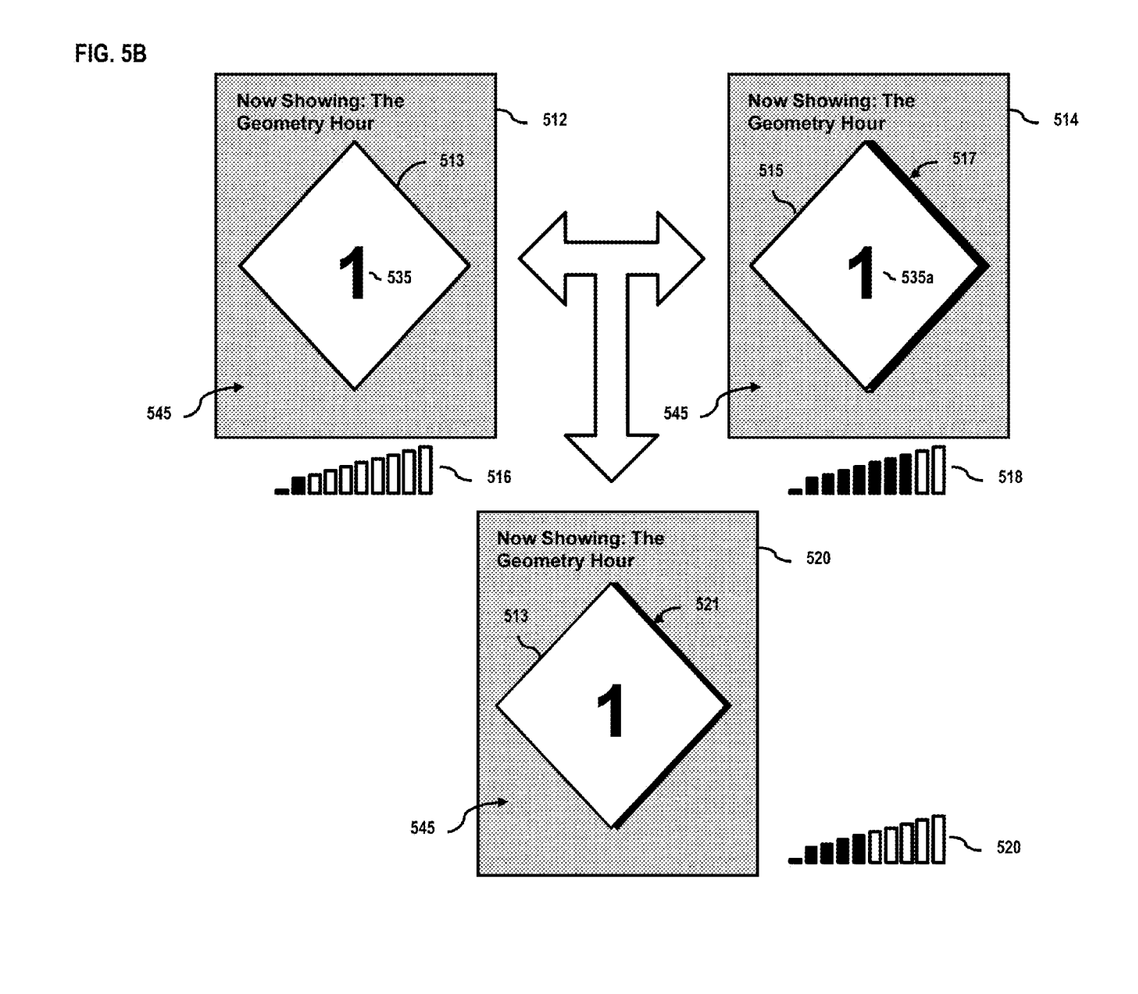

FIGS. 5A and 5B are diagrams of content as presented to a display of a set-top box based on various depth setting parameters of viewers, according to an exemplary embodiment. For illustration purposes, the content corresponds to a television broadcast entitled "The Geometry Hour," which is rendered converted from 2D to 3D in real-time by the 3D content platform.

In FIG. 5A, a display 500 is shown to present the content with a depth setting parameter of 1. A depth setting indicator 509 corresponding to this setting is shown for example purposes. The content includes an object 501 with a number 503 imposed within. A shape is presented with respect to a background 505 featuring a gradient texture. In this example, the corresponding depth setting parameter of 1 corresponds closely to a 2D version of the content, wherein limited to no depth characteristics are featured.

When more depth is desired, the viewer can adjust the depth setting parameter on demand by selecting the increase button (e.g., button 405 of FIG. 4A) of the remote control device. Alternatively, the user identifier of the viewer may be identified for automatically rendering content to the display 500 based on the preferred depth setting parameter of the viewer. In the first scenario, successive pressing of the increase button 405 causes a depth setting indicator to be presented to the interface, such as shown in FIG. 4A. The number of shaded bars in the indicator represents a specific depth setting parameter to be employed for rendering content via the set-top box. It is noted that the content itself may be shown to change dynamically in response to the increasing/decreasing of the depth setting parameter. As such, the viewer can visually inspect the resulting depth setting.

In this example, the user increases the depth setting parameter to 6, corresponding to the depth setting indicator 511. As a result, a refreshed content display 500a presents the object 501 as featuring additional characteristics to enhance its 3D appearance, including a depth gradient 507 for representing protrusion of the shape 501 from the background 505. The dept gradient 507 corresponds to the depth setting parameter of 6 to create the perception of depth of the object 501. In addition, the number 503 is also caused to exhibit a depth affect, such as in the form of a shading or shadow for representing a protrusion from the object 501. It is noted that protrusion, offset, depth, etc. all correspond to a three-dimensional affect, wherein the viewer is caused to process images presented to the display 500 as if they were "popping out" of the screen.

In FIG. 5B, two different displays 512 and 514 are shown for presenting content corresponding to the depth settings of two different viewers. The depth setting indicators 516 and 518 of the respective displays 512 and 514 are shown as they would appear individually via the set-top box. A depth setting parameter of 1 is applied by the 3D content platform for generating content featuring object 513 while a depth setting parameter of 7 is applied in generating content featuring the same object 513 for display 514. By way of example, object 513 as presented at display 514 includes a greater depth gradient 517 than that of object 513 of display 512. Also, additional depth characteristics (e.g., shading, shadowing) are applied to the number 535a as presented to display 514. The display of the set-top box as a result of the combining, averaging or compensating for the two different viewers and hence different depth setting parameters is shown by indicator 520.

As noted previously, the 3D content platform generates a compensatory depth setting based on the average of the different depth setting parameters of different users. Under this scenario, the average of the depth setting parameters corresponding to indicators 516 and 518 is 4 ((1+7)±2)). The resulting compensatory depth setting parameter is shown to be represented by indicator 520. Also, the content is shown to feature 3D characteristics corresponding to the compensatory value, including a smaller depth gradient 521 representing a balance between that applied to object 513 in display 512 and as applied in display 514. It is noted in this example that the background 545 remains constant—i.e., only select objects are generated by the 3D content platform to exhibit 3D effects.

The exemplary system and techniques presented herein enables viewers to control the depth of three-dimensional content rendered via a set-top box. One advantage is that the remote control device may feature one or more buttons for enabling a 3D mode of operation of the set-top box. Another advantage is that the 3D content platform may be configured to enable on demand adjusting of the depth setting parameter for affecting generation of content according to a three-dimensional format. As yet another advantage, the 3D content platform enables automated rendering of content to the set-top box based on a depth setting parameter indicated in a profile related to the user. As such, 3D content may be dynamically adapted to accommodate one or more viewers in real-time.

The processes described herein for enabling a user to interact with and control a set-top box using a remote control device having a touch screen may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
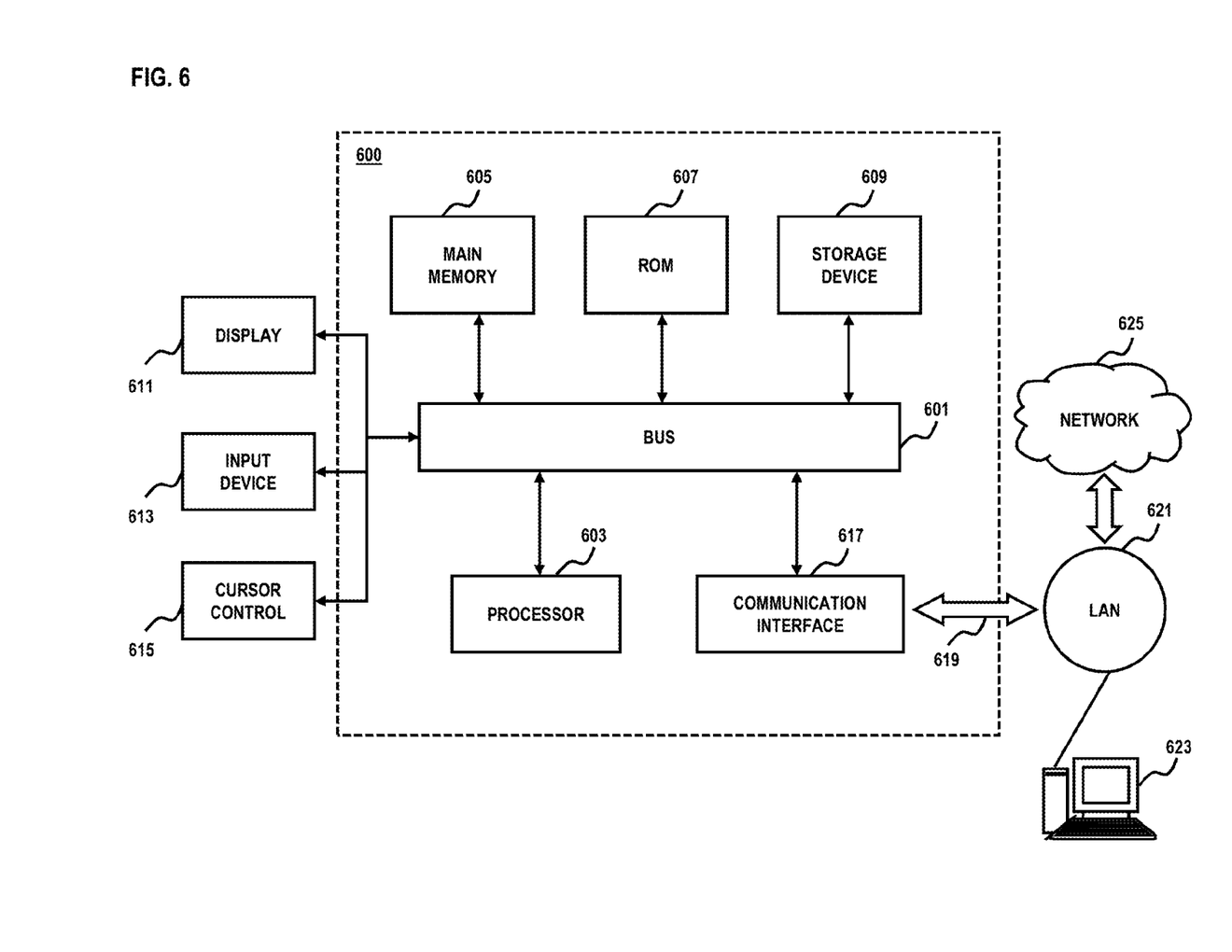
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
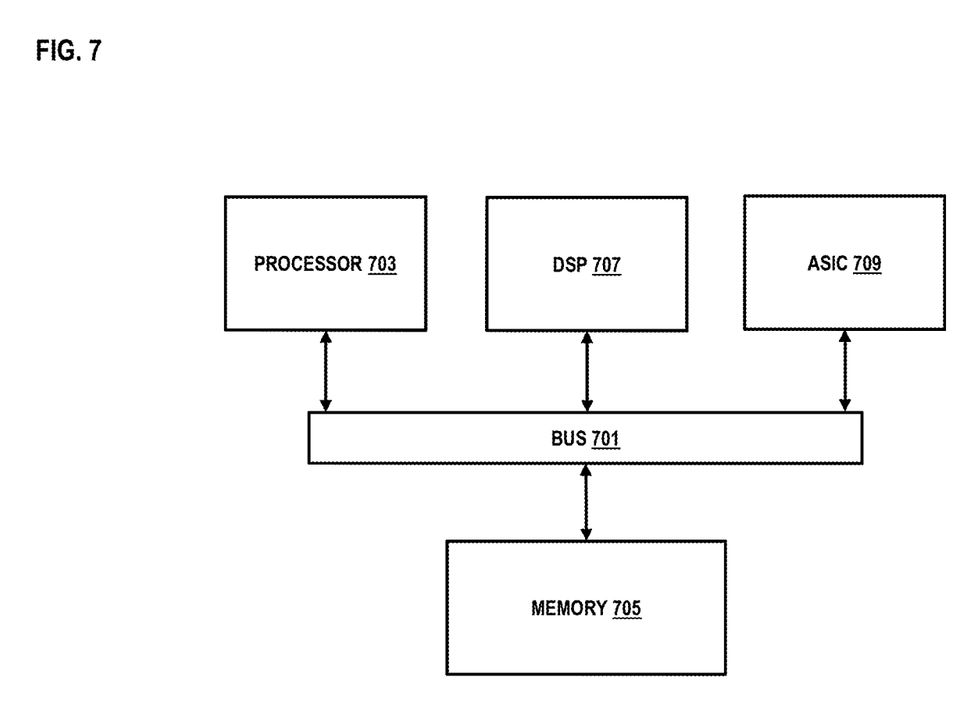
FIG. 7 is a diagram of a chip set that can be used to implement an embodiment of the invention.

FIG. 7 illustrates a chip set or chip 700 upon which an embodiment of the invention may be implemented. Chip set 700 is programmed to enable viewers to control the depth of three-dimensional content rendered via a set-top box as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling viewers to control the depth of three-dimensional content rendered via a set-top box.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable viewers to control the depth of three-dimensional content rendered via a set-top box. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
 receiving a user input specifying a mode of operation of a content processing device;
 determining a number of viewers within a range of the content processing device;
 adjusting a depth setting parameter based, at least in part, on the determined number of viewers and the mode of operation; and
 presenting content at the adjusted depth setting parameter according to a three-dimensional format for display via the content processing device.

2. A method of claim 1, further comprising:
 determining user profile information associated with the viewers; and
 determining the depth setting parameter based on the user profile information.

3. A method of claim 2, wherein the user profile information includes depth settings of the viewers, and the method further comprising:
averaging the depth settings of the viewers as the depth setting parameter.

4. A method of claim 3, further comprising:
assigning a default depth setting to one or more of the viewers whose depth settings are not available, wherein the default depth setting is used for the averaging.

5. A method of claim 4, further comprising:
presenting a depth adjustment indicator that indicates a level of the depth setting parameter, the number of the viewers, a number of the one or more of the viewers whose depth settings are not available, or a combination thereof.

6. A method of claim 1, further comprising:
detecting the number of viewers within the range of the content processing device via one or more sensors, a short range communication network, a location based service, or a combination thereof.

7. A method of claim 6, wherein the one or more sensors, the short range communication network, the location based service, or a combination thereof, are associated with the content processing device, user devices associated with the viewers, one or more display displaying the content at the adjusted depth setting parameter, or a combination thereof.

8. A method of claim 1, further comprising:
embedding supplemental content in the content presented at the adjusted depth setting parameter according to the three-dimensional format, wherein the supplemental content includes one or more messages, one or more advertisements, or a combination thereof.

9. A method of claim 1, wherein the three-dimensional format enables stereoscopic viewing of the content, auto-stereoscopic viewing of the content, or a combination thereof.

10. An apparatus comprising:
at least one processor; and
at least one memory including computer program code for one or more programs,
the at least one memory and the computer program code configured to, with the at least one processor, cause the apparatus to perform at least the following,
receive a user input specifying a mode of operation of a content processing device;
determine a number of viewers within a range of the content processing device;
adjust a depth setting parameter based, at least in part, on the determined number of viewers and the mode of operation; and
present content at the adjusted depth setting parameter according to a three-dimensional format for display via the content processing device.

11. An apparatus of claim 10, wherein the apparatus is further caused to:
determine user profile information associated with the viewers; and
determine the depth setting parameter based on the user profile information.

12. An apparatus of claim 11, wherein the user profile information includes depth settings of the viewers, and the apparatus is further caused to:
average the depth settings of the viewers as the depth setting parameter.

13. An apparatus of claim 12, wherein the apparatus is further caused to:
assign a default depth setting to one or more of the viewers whose depth settings are not available, wherein the default depth setting is used for the averaging.

14. An apparatus of claim 13, wherein the apparatus is further caused to:
present a depth adjustment indicator that indicates a level of the depth setting parameter, the number of the viewers, a number of the one or more of the viewers whose depth settings are not available, or a combination thereof.

15. An apparatus of claim 10, wherein the apparatus is further caused to:
detect the number of viewers within the range of the content processing device via one or more sensors, a short range communication network, a location based service, or a combination thereof.

16. An apparatus of claim 15, wherein the one or more sensors, the short range communication network, the location based service, or a combination thereof, are associated with the content processing device, user devices associated with the viewers, one or more display displaying the content at the adjusted depth setting parameter, or a combination thereof.

17. An apparatus of claim 10, wherein the apparatus is further caused to:
embed supplemental content in the content presented at the adjusted depth setting parameter according to the three-dimensional format, wherein the supplemental content includes one or more messages, one or more advertisements, or a combination thereof.

18. An apparatus of claim 10, wherein the three-dimensional format enables stereoscopic viewing of the content, auto-stereoscopic viewing of the content, or a combination thereof.

19. A content processing device comprising:
a communication interface configured to receive a user input specifying a mode of operation of the content processing device;
a processor configured to determine a number of viewers within a range of the content processing device, and to adjust a depth setting parameter based, at least in part, on the determined number of viewers and the mode of operation; and
a display configured to present content at the adjusted depth setting parameter according to a three-dimensional format for display via the content processing device.

20. A content processing device of claim 19, wherein the processor is further configured to:
determine user profile information associated with the viewers; and
determine the depth setting parameter based on the user profile information,
wherein the content processing device is a remote control device, a display device, a wireless communication device, a computer, or a set top box.

\* \* \* \* \*